(12) United States Patent
Gass et al.

(10) Patent No.: US 6,804,896 B2
(45) Date of Patent: Oct. 19, 2004

(54) ELECTRONIC MEASURING DEVICE

(75) Inventors: Bruno W. Gass, Stouffvilee (CA);
Manuel L. Avelar, Toronto (CA)

(73) Assignee: Magna International Inc., Ontario (CA)

( * ) Notice: Subject to any disclaimer, the term of this patent is extended or adjusted under 35 U.S.C. 154(b) by 0 days.

(21) Appl. No.: 10/324,081

(22) Filed: Dec. 20, 2002

(65) Prior Publication Data

US 2003/0121165 A1 Jul. 3, 2003

Related U.S. Application Data

(60) Provisional application No. 60/341,857, filed on Dec. 21, 2001.

(51) Int. Cl.[7] .............................. G01B 3/18; G08B 21/00
(52) U.S. Cl. ...................... 33/558; 33/820; 340/686.5; 340/686.1
(58) Field of Search ........................... 340/568.1, 686.1, 340/686.4, 686.5, 687; 33/558, 832, 833, 813, 818, 820, 564, 836

(56) References Cited

U.S. PATENT DOCUMENTS

| | | | |
|---|---|---|---|
| 2,384,519 A | 9/1945 | Aller | |
| 2,492,067 A | 12/1949 | Schildmeier | |
| 3,031,617 A | 4/1962 | Paquette | |
| 3,166,851 A | 1/1965 | Shirakura et al. | |
| 3,557,462 A | 1/1971 | Kiewicz et al. | |
| 3,670,420 A | 6/1972 | Kiewicz et al. | |
| 3,844,047 A | 10/1974 | Carson | |
| 4,223,444 A | 9/1980 | Perreault | |
| 4,441,257 A | 4/1984 | Golinelli et al. | |
| 4,477,976 A | 10/1984 | Suzuki | |
| 4,555,857 A | 12/1985 | Christoffel et al. | |
| 4,608,763 A | 9/1986 | Manns et al. | |
| 4,679,326 A | 7/1987 | Takizawa et al. | |
| 4,679,332 A | 7/1987 | Luthi | |
| 4,711,034 A | * 12/1987 | Koizumi | 33/832 |
| 4,769,919 A | 9/1988 | Lloyd et al. | |
| 4,956,923 A | * 9/1990 | Pettingell et al. | 33/558 |
| 5,433,015 A | 7/1995 | Mazenet | |
| 5,594,995 A | * 1/1997 | Matsuhashi | 33/558 |
| 5,596,813 A | * 1/1997 | Olson et al. | 33/831 |
| 6,163,974 A | * 12/2000 | Masek et al. | 33/558 |
| 6,295,866 B1 | * 10/2001 | Yamamoto et al. | 33/558 |
| 6,301,796 B1 | * 10/2001 | Cresson | 33/558 |
| 6,484,571 B1 | * 11/2002 | Hidaka et al. | 33/558 |
| 6,526,670 B1 | * 3/2003 | Carli | 33/558 |
| 6,526,672 B1 | * 3/2003 | Danielli et al. | 33/558 |

* cited by examiner

*Primary Examiner*—G. Bradley Bennett
(74) *Attorney, Agent, or Firm*—Pillsbury Winthrop LLP

(57) ABSTRACT

An embodiment of an electronic measuring device includes a housing having an exterior surface configured and arranged to be removably secured within a support member. An electrically conductive probe is coupled to the housing and is movable between a position in contact with a workpiece and a position out of contact with the workpiece. A circuit electrically couples an indicator and a power source to the probe such that when the probe is out of contact with the workpiece, the circuit is open and no power is supplied from the power source to the indicator and such that when the probe contacts the workpiece, the circuit closes to supply power from the power source to the indicator to send a signal to the operator of the measuring device that the probe is in contact with the workpiece.

30 Claims, 10 Drawing Sheets

ELECTRONIC MEASURING DEVICE

The present application claims priority to U.S. Provisional Application of Bruno W. Gass et al., Application No. 60/341,857, filed Dec. 21, 2001, the entire contents of which are hereby incorporated herein by reference thereto.

FIELD OF THE INVENTION

The present invention is generally related to sensing and measuring devices. The illustrative embodiments of the present invention are related to electronic position sensing devices.

BACKGROUND OF THE INVENTION

Manufactured parts are often required to be in within certain tolerances. Individual parts are frequently measured to determine whether or not their dimensions are accurate before they are assembled to other parts.

The problem of determining the dimensional accuracy of a part is often complicated by the fact that measuring equipment is expensive for the manufacturer to purchase and maintain and difficult for an operator to use. For example, coordinate measuring machines, or CMM machines, are sometimes used to measure manufactured parts for dimensional accuracy. Although coordinate measuring machines are accurate, they are also expensive, large and not portable, difficult for the worker to learn to operate, and time-consuming to set up and use. Ferro arms are also sometimes used to verify the dimensional accuracy of parts, but are also expensive, large, difficult to learn to operate, and are time-consuming to use when taking a series of measurements on a series of parts.

The problem of checking the dimensional accuracy of parts is often further complicated by the fact that portions of a part to be checked for dimensional accuracy may move or flex when a measuring instrument contacts the part. This movement of the part due to contact with the measuring instrument can result in measuring inaccuracies.

SUMMARY OF THE ILLUSTRATIVE EMBODIMENT OF THE INVENTION

The illustrative embodiment of the present invention provides an electronic measuring device that includes a housing having an exterior surface configured and arranged to be removably secured within a support member such that the housing can be removably replaced in the support member. An electrically conductive probe is coupled to the housing and is configured and arranged to extend through the support member and move between a position in contact with a workpiece and a position out of contact with the workpiece. An indicator and a power source are disposed within the housing. A circuit electrically couples the probe to the indicator and to the power source such that when the probe is out of contact with the workpiece, the circuit is open and no power is supplied from the power source to the indicator and such that when the probe contacts the workpiece, the circuit closes to supply power from the power source to the indicator to send a signal to the operator that the probe is in contact with the workpiece.

The illustrative embodiments also provide a measuring assembly comprising a fixture for removably holding a workpiece to be measured, a support member positioned a predetermined distance from the fixture and an electronic measuring device. The measuring device includes a housing having an exterior surface configured and arranged to be removably secured within the support member such that the measuring device can be removably replaced in the support member. An electrically conductive probe is coupled to the housing for movement between a position in contact with the workpiece and a position out of contact with the workpiece. An indicator and a power source are both disposed in the housing. A circuit electrically connects the probe to the indicator and to the power source such that when the probe is out of contact with the workpiece, the circuit is open and the power source does not provide power to the indicator and such that when the probe contacts the workpiece, the circuit closes such that power is provided to the indicator to activate the indicator to send a signal to the operator of the measuring device that the probe is in contact with the workpiece.

The illustrative embodiments of the present invention further provide methods for measuring a workpiece using a measuring device including providing a fixture for removably holding a first workpiece to be measured, providing a support member positioned a predetermined distance from the fixture and providing an electronic measuring device. The measuring device includes a housing having an exterior surface configured and arranged to be removably secured to the support member, an electrically conductive probe coupled to the housing for movement between a position in contact with the first workpiece and a position out of contact with the first workpiece, and an indicator and a power source. Both the indicator and the power source are disposed within the housing. The example method also includes providing a circuit electrically connecting the probe, the indicator and the power source such that when the probe is out of contact with the first workpiece, the circuit is open and no power is supplied from the power source to the indicator and such that when the probe contacts the first workpiece, the circuit closes and power is supplied from the power source to the indicator to signal the operator of the measuring device that the probe is in contact with the first workpiece. The method also includes removeably holding the first workpiece in the fixture, removably securing the measuring device into the support member and moving the probe into contact with the first workpiece until contact is made and the indicator sends the signal that contact with the first workpiece is achieved. The method next recites removing the first workpiece from the fixture and inserting a second workpiece into the fixture for measuring.

Other aspects, features and advantages of the present invention and the illustrative embodiments will become apparent from the following detailed description, the accompanying drawings, and the appended claims.

DETAILED DESCRIPTION

Figure 1:
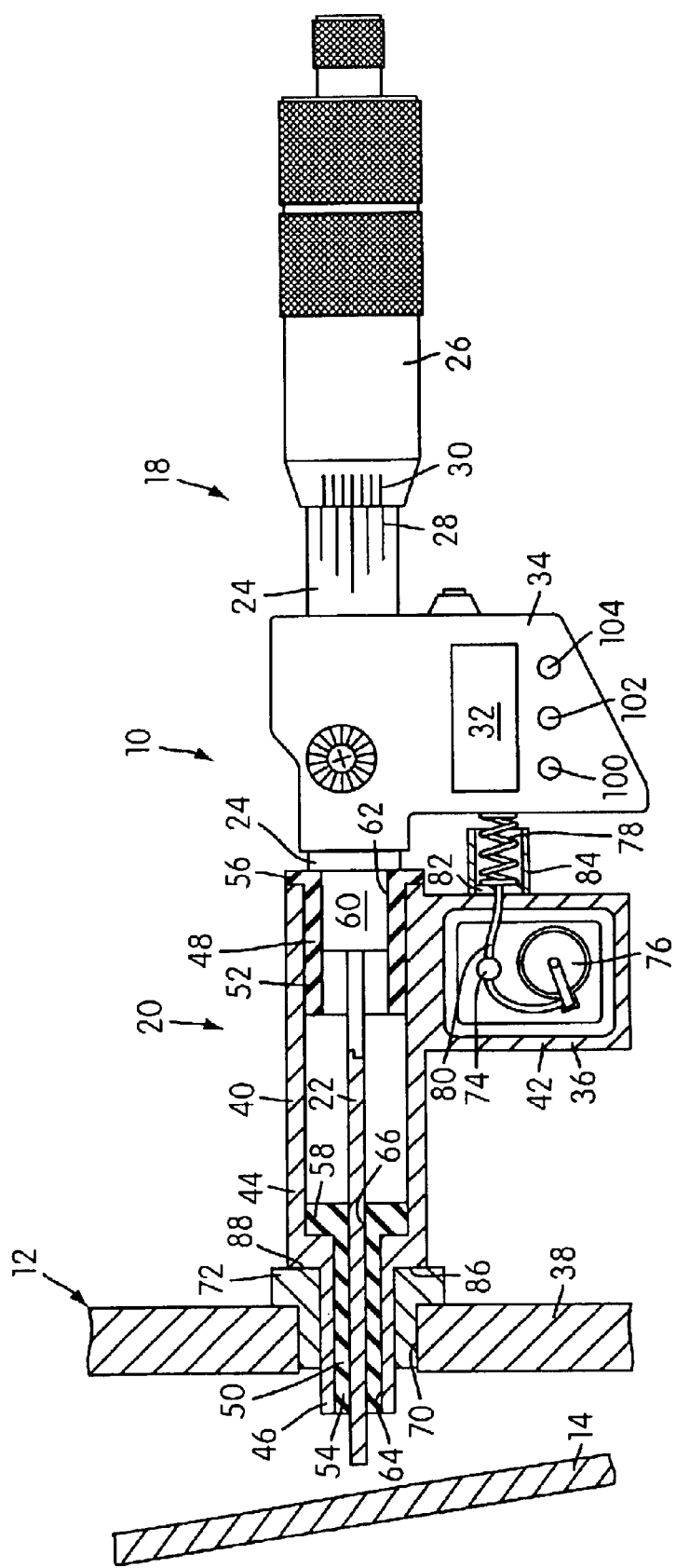
FIG. 1 is an elevational view of a first illustrative embodiment of a measuring device constructed according to the principles of the present invention, the figure showing the measuring device removably supported on a support member in spaced relation to a workpiece shown in fragmentary view, the figure showing the adapter, the support member and the workpiece in cross sectional view.
Figure 2:
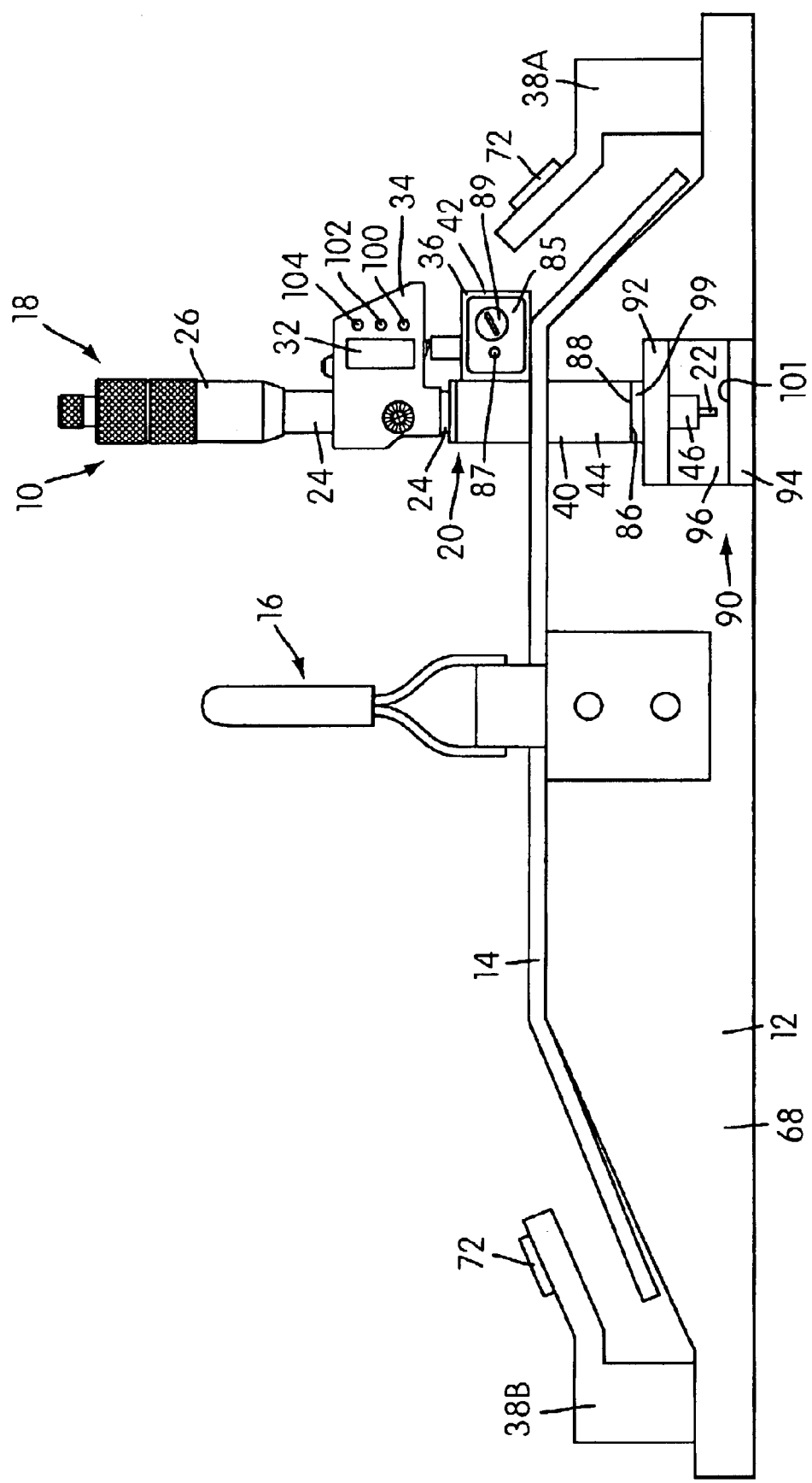
FIGS. 2–5 show a series of views of the measuring device of FIG. 1 being utilized in conjunction with a fixture to measure the workpiece.
Figure 3:
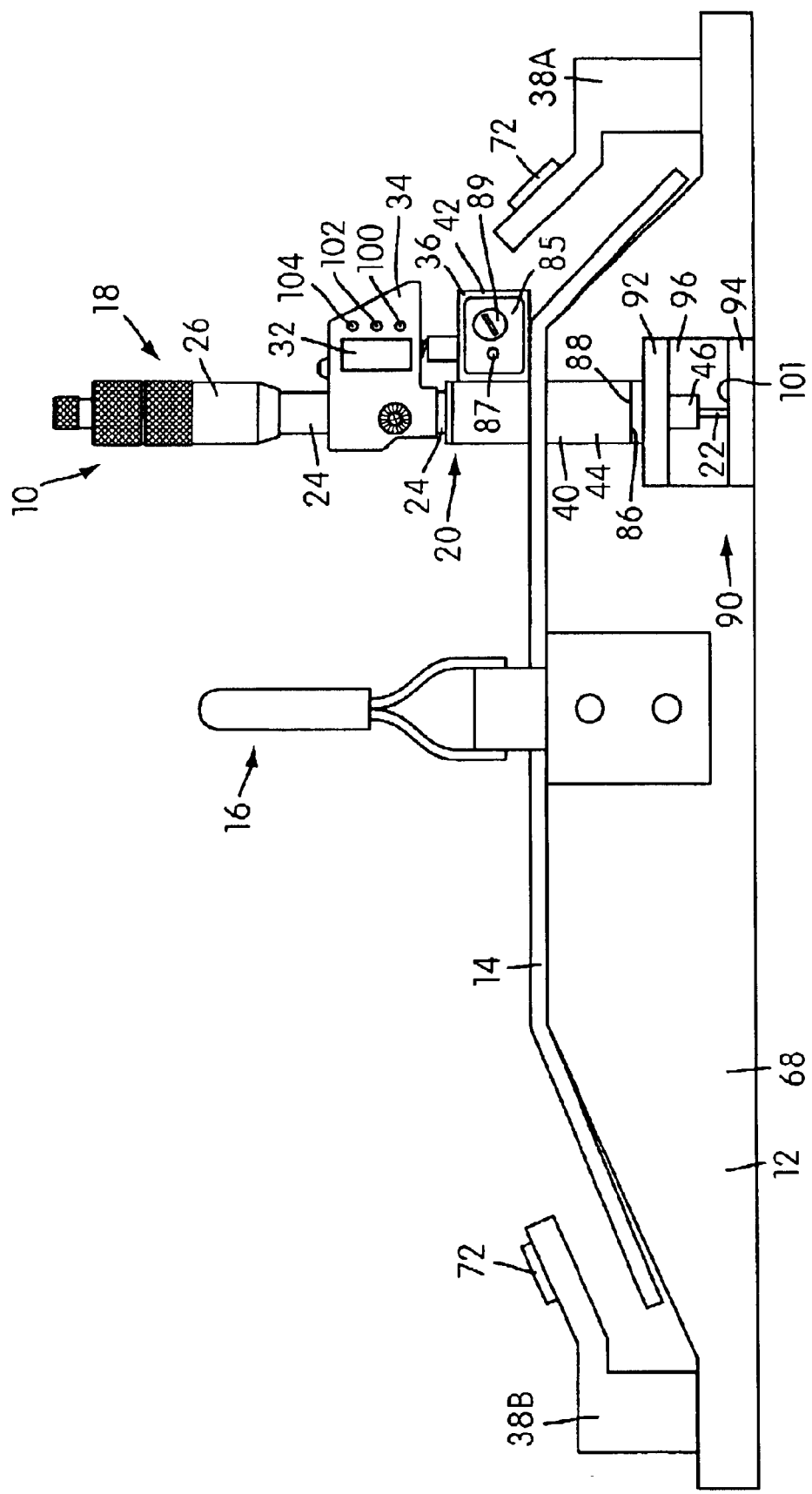
Figure 4:
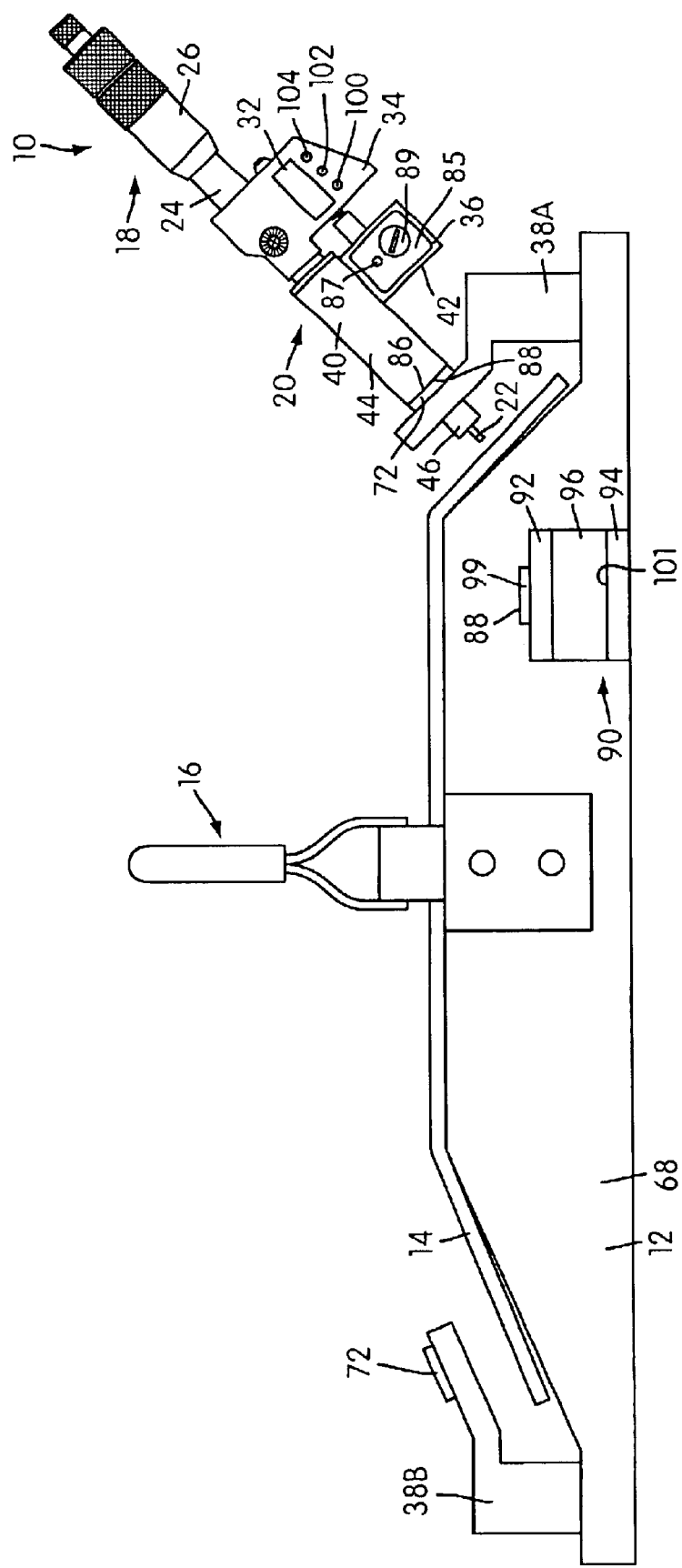
Figure 5:
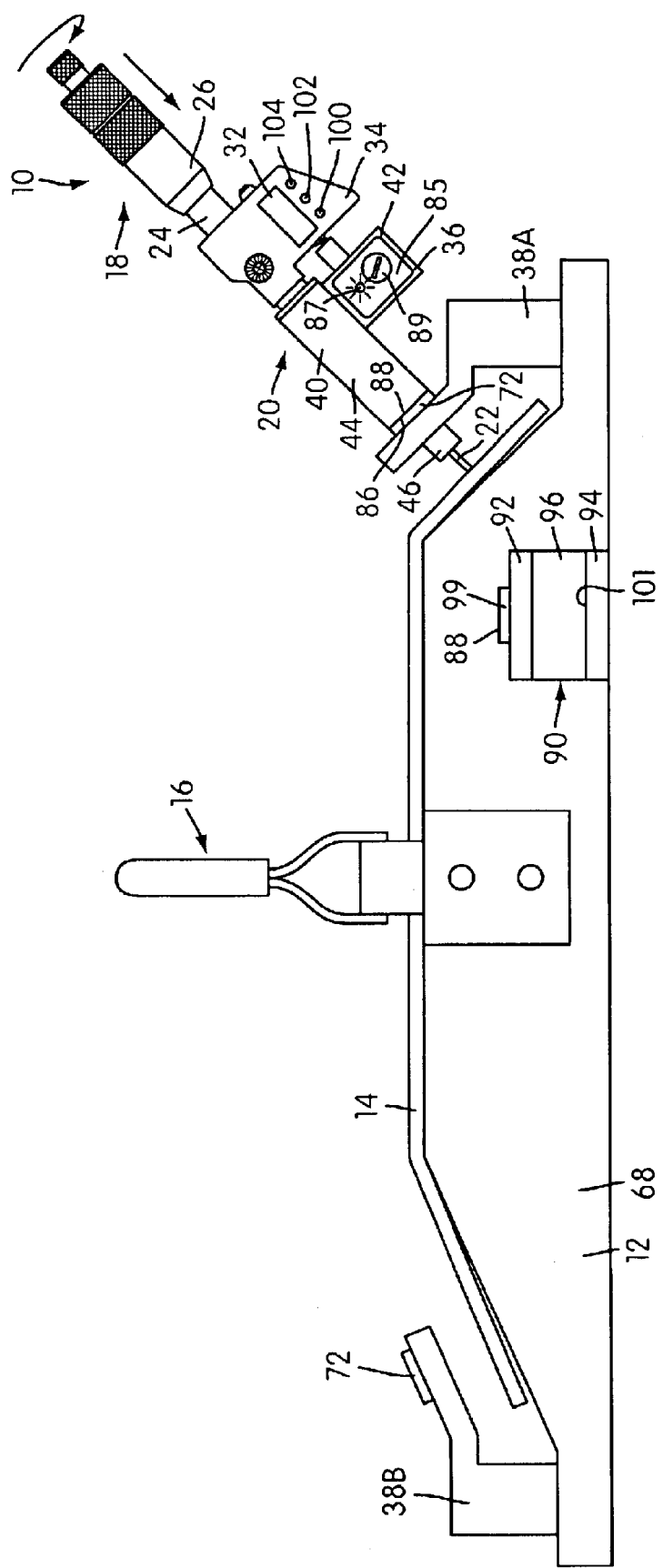

FIG. 1 shows a first illustrative embodiment of a position sensing device adapted for use as a measuring device 10. The measuring device 10 may be used in conjunction with a fixture 12 (see FIGS. 2–5) to check the dimensional accuracy of a manufactured part or workpiece 14 which is held in the fixture 12 by one or more clamps 16.

The example measuring device 10 generally includes a micrometer assembly 18 and an adapter 20 mounted on the micrometer assembly 18. As will become apparent, the adapter 20 includes electronic circuitry that functions to signal the operator of the measuring device when the micrometer assembly 18 is in contact with the workpiece 14. The micrometer assembly 18 may be an adaptation of a conventional, commercially available component. For example, the micrometer assembly may be developed from a Series 128, Series 129, Series 130 or a Series 229 Depth Micrometer commercially available from the Mitutoyo Corporation, Kanagawa, Japan.

The micrometer assembly 18 includes a probe 22 that is movably mounted in a sleeve 24 of the micrometer assembly 18. The probe 22 may translate or rotate as a probe to move relative to the workpiece 14 during operation. The probe 22 and the sleeve 24 are threadedly engaged with one another so that when the probe 22 is rotated relative to the sleeve, it moves longitudinally with respect to the sleeve 24. A thimble 26 is mounted on an end of the probe 22. The probe 22 can be translated or rotated by rotating the thimble 26. The sleeve 24 and the thimble 26 may have calibration markings 28, 30, respectively, for determining the distance the probe 22 has moved longitudinally with respect to the sleeve 24. The example micrometer assembly includes a display 32 that is mounted in a micrometer housing 34 that extends outwardly from the sleeve 24. A power supply and electronic circuitry within the housing 34 of the micrometer assembly 18 operate in conjunction with the calibration markings 28, 30 to indicate the position of the probe 22 relative to the sleeve 24 through a number shown on the display 32. The probe 22, the sleeve 24, the thimble 26 and the micrometer housing 34 are each constructed of an electrically conductive material, such as metal, the significance of which is explained below.

The adapter 20 includes a housing 36 and electronic circuitry disposed within the housing 36. The housing 36 is constructed of an electrically conductive material, such as a metal material, and, as will become apparent, has an exterior surface configured and arranged to be removably secured within each of a plurality of support members 38 of the fixture 12. FIG. 1 shows the housing 36 mounted in a support member 38 of the fixture 12. The housing 36 includes a cylindrical portion 40 of generally tubular construction and an integral outwardly extending portion 42 that contains portions of the circuitry of the adapter 20 as explained below.

The tubular portion 40 of the housing 36 includes a relatively large diameter body portion 44 and a relatively small diameter neck portion 46. A pair of bushings 48, 50 are mounted within the body portion 44 of the adapter 20. Each bushing 48, 50 is constructed of an electrically non-conductive material such as a rubber, a plastic, or a composite material. Each bushing 48, 50 includes an annular wall portion 52, 54, respectively, and an outwardly extending annular flange 56, 58, respectively, integrally formed with the annular wall portion thereof. The bushings 48, 50 may be mounted in the body portion 44 of the housing 36 by interference fit, with the use of an adhesive, or by any other appropriate means.

The adapter 20 is mounted on the micrometer assembly 18 by inserting a reduced diameter outer portion 60 of the sleeve 24 into the interior of the bushing 48 of the adapter 20. The outer portion 60 of the sleeve 24 and the interior of the bushing 48 each have cylindrical transverse cross-sections. The bushing 48 may be a resilient material that enables the adapter to be removably retained on the micrometer assembly 18 by interference fit. The body portion 44 of the adapter 20 has a generally tubular, cylindrical construction with open opposite ends 62, 64. When the adapter 20 is mounted on the micrometer assembly 18, the probe 22 of the micrometer assembly 18 extends through a central opening 66 in the bushing 50. The bushings 48, 50 electrically insulate the micrometer assembly 18.(including the probe 22 and the sleeve 24 thereof) from the electrically conductive housing 36 of the adapter 20. The reasons the housing 36 of the adapter 20 is electrically insulated from the micrometer assembly 18 are considered below.

The measuring device 10 can be used to check a workpiece 14 that is partially or completely constructed of an electrically conductive material for dimensional accuracy. An example verification procedure can be understood from an examination of FIGS. 1–5. To verify that the dimensions of the workpiece 14 are within acceptable tolerance levels, the workpiece 14 is removably secured within the fixture 12 by using, for example, the clamp 16. The fixture 12 includes a base 68, the clamp 16 and a plurality of support members 38. The support members 38 of the example fixture 12 are of substantially identical construction to one another. The support members 38 are identified by the same reference numeral for convenience. Letter designations are used as appropriate to distinguish the support members 38 from one another in the discussion. Each support member 38 includes an opening 70 and preferably includes a bushing 72 mounted within the opening 70 thereof. The structure of the opening 70 and the bushing 72 is best appreciated from FIG. 1 which shows (in cross sectional view) the measuring device 10 in relation to a fragment of the support member 38 and the workpiece 14.

The fixture 12, the support member 38, the bushing 72 and the workpiece 14 are each preferably constructed, at least in part, of an electrically conductive material, the significance of which will become apparent from the description below.

The housing 36 has an exterior surface configured and arranged to be removably secured within the support member 38. The probe 22 provides an electrically conductive probe that is coupled to the housing 36 for movement toward and away from the workpiece when the measuring device 10 is mounted in the support member 38. As can be appreciated from FIG. 1, when the housing 36 is mounted in the support member 38, the probe 22 extends through the support member 38 and is movable between a position in contact with the workpiece 14 (see FIG. 1, for example) and a position out of contact with the workpiece (see FIG. 4, for example).

An indicator 74 and a power source 76 are disposed within the outwardly extending portion 42 of the housing 36.

In the illustrative measuring device 10, the power source 76 is a battery and the indicator 74 is a light source. The example battery 76 shown can be of the type used in watches and in other small electronic devices. The light source may be a light bulb or a light emitting diode (LED). The probe 22 is electrically coupled to the indicator 74 and the power source 76 such that when the probe of 22 is out of contact with the workpiece 14 (FIG. 4), the circuit is open and no power is supplied from the power source 76 to the indicator 74 and such that when the probe 22 contacts the workpiece 14 (FIG. 5), the circuit closes to supply power from the power source 76 to the indicator 74 to send a signal to the operator of the measuring device 10 that the probe is in contact with the workpiece 14.

More specifically, a first terminal (or pole) of the battery 76 is electrically connected to the housing 36 of the adapter 20 and a second pole of the battery 76 is connected to a first terminal of the light source 74. A second terminal of the light source 74 is connected to a metal coil spring 78 through an electrical conductor such as wire 80. The coil spring 78 is electrically insulated from the housing 36 of the adapter 20 by an insulation member 82 positioned between the coil spring 78 and the housing 36 and by a sleeve 84 that is secured to the insulation member 82. The insulation member 82 and the sleeve 84 are constructed of an electrically insulating material. The sleeve 84 extends outwardly from the insulation member 82 and is wrapped around the coil spring 78. The coil spring 78 functions to electrically connect the second terminal of the light source 74 to the housing 34 of the micrometer assembly 18. The housing 34 of the micrometer assembly 18 is electrically connected to the probe 22. A removable cover 85 (FIG. 2) covers the electrical components (including the power source 76 and the indicator 74) disposed in the housing 36 of the adapter 20. Light from the light source 74 is visible through an opening 87 in the cover 85. The cover 85 may be removable to access the electronics and to replace the bulb as necessary. The cover 85 includes a separately removable battery cover 89 for replacing the battery.

The support members 38 are arranged on the fixture 12 to verify selected dimensions of a workpiece 14 mounted in the fixture 12. When the measuring device 10 is mounted in a support member 38, a support surface 86 of the housing 36 is in contact with an outer surface 88 on fixture, such as with the bushing 72 (FIG. 1). The measuring device 10 is operable to measure the distance between the support surface 88 on the support member 38 and a particular location on the workpiece 14. In the example arrangement, each support member 38 is positioned so that the support surface 88 thereof is a predetermined distance from the fixture 12 and therefore a predetermined distance from a dimensionally accurate, i.e., an "ideal," workpiece 14 when the workpiece 14 is mounted in the fixture 12.

The predetermined distance may be any appropriate distance and will be a result of the structural configuration between the probe 22 and the workpiece 14. In the example measuring system, it will be assumed that each support member 38 is positioned such that the support surface 88 thereof is the predetermined distance from the particular location on the workpiece to be measured.

A reference stand 90 can be mounted on the fixture 12. The example reference stand 90 is a C-shaped structure and is constructed of an electrically conductive material. The example reference stand 90 is preferably a metal structure that includes an upper portion 92, a bottom portion 94 and a vertically extending wall portion 96 extending therebetween. The upper portion 92 includes a central opening (not shown) and a bushing 99 mounted in the opening. The reference stand 90 is used to calibrate or "zero" the measuring device 10.

To zero the device 10, the measuring device 10 is placed in the stand 90 so that the support surface 86 is against the outer surface 88 of the bushing 99 (in a manner similar to the manner in which the measuring device 10 is mounted in the support member 38 as shown in FIG. 1, for example). The reference stand 90 is constructed such that the distance from the outer surface 88 thereof to the top surface 101 of the bottom portion 94 is the predetermined distance. It will be assumed that the probe 22 is initially spaced from the bottom wall 94. The operator turns the thimble 26 to move the probe 22 towards the surface 101 of the bottom portion 94 of the stand 90. The indicator circuit is generally connected between the housing 36 and the probe 22 such that when the probe 22 is out of contact with the top surface 101 of the wall portion 94, the indicator circuit is open and the power source 76 is not supplying power to the indicator 74. When the probe 22 touches the surface 101 of the bottom wall portion 94 of the stand 90, the indicator circuit closes to energize the indicator 74.

Specifically, the probe 22 is electrically connected to the sleeve 24 and the housing 34 of the micrometer assembly 18 because the probe 22, sleeve 24 and housing 34 are each constructed of a respective conductive material such as metal and they are in contact with one another. The housing 34 of the micrometer assembly 18, and therefore the probe 22, are electrically connected to the second terminal of the light source 74 through the coil spring 78 and wire 30. The housing 36 of the adapter 20 (and hence the first terminal of the battery) is electrically connected to the reference stand 90 through the bushing 72. Hence, when the probe 22 touches the surface 101 of the bottom wall 94 of the reference stand 90, the circuit is closed and the light source 74 is energized. This signals the operator to stop turning the thimble 26. The operator may then set the micrometer assembly 18 to a zero reading by depressing a control button 100. It will be recalled that the distance between the outer surface 88 of the bushing 99 and the top surface 101 of the bottom wall 94 of the stand 90 is equal to the predetermined distance between the fixture 12 and the workpiece 14.

The assembly 18 may perform other functions as well. For example, a second button 102 on the measuring device 10 may select the units (inches or centimeters, for example) of measurement and a third button 104 may hold or store a measured value.

The operator then removes the measuring device 10 from the reference stand 90 and inserts the measuring device 10 in support member 38A. The support member 38 is positioned so that if the workpiece 14 is dimensionally accurate, the distance between the outer surface 88 on the bushing 72 and the adjacent surface of the workpiece 14 is the predetermined distance. The operator adjusts the thimble 26 so that the end of the probe 22 just touches the workpiece 14. That is, if the end of the probe 22 is out of contact with the workpiece 14 when the measuring device 10 is removably secured in the support member 38A, the operator moves the probe 22 toward the workpiece 14 with the thimble 26. The operator stops turning the thimble 26 when the light 74 comes on. If, on the other hand, the end of the probe 22 is in contact with the workpiece 14 when the measuring device 10 is removably secured in the support member 38A, the operator moves the probe 22 away from the workpiece 14 by rotating (or turning) the thimble 26 and stops turning the thimble 26 as soon as the light 74 goes out.

If the workpiece 14 is very flexible, the workpiece 14 may oscillate back and forth slightly with respect to its equilibrium or "resting" position. In this case, the operator may adjust the position of the probe 22 until the light "flickers", indicating that the probe 22 is positioned approximately at the equilibrium point the workpiece 14 would assume if it were motionless.

The operator then reads the measuring device 10 (such as the value on the display 32) which will indicate whether or not and how much the workpiece 14 is out of tolerance. For example, if the workpiece 14 is exactly the predetermined distance from the outer surface 88 on the bushing 72 on the support member 38A, the display 102 will read "zero." If the workpiece 14 is farther from or closer to the reference stand 90 than it should be, the display 102 can be configured to show a positive or negative number, respectively, that indicates the amount the workpiece 14 is out of tolerance. The operator may then check the tolerance at support member 38B and at other support members, if needed. After one workpiece is checked for dimensional accuracy, the workpiece can be removed from the fixture 12 and another workpiece can be mounted in the fixture 12 and checked in the same way.

Figure 6:
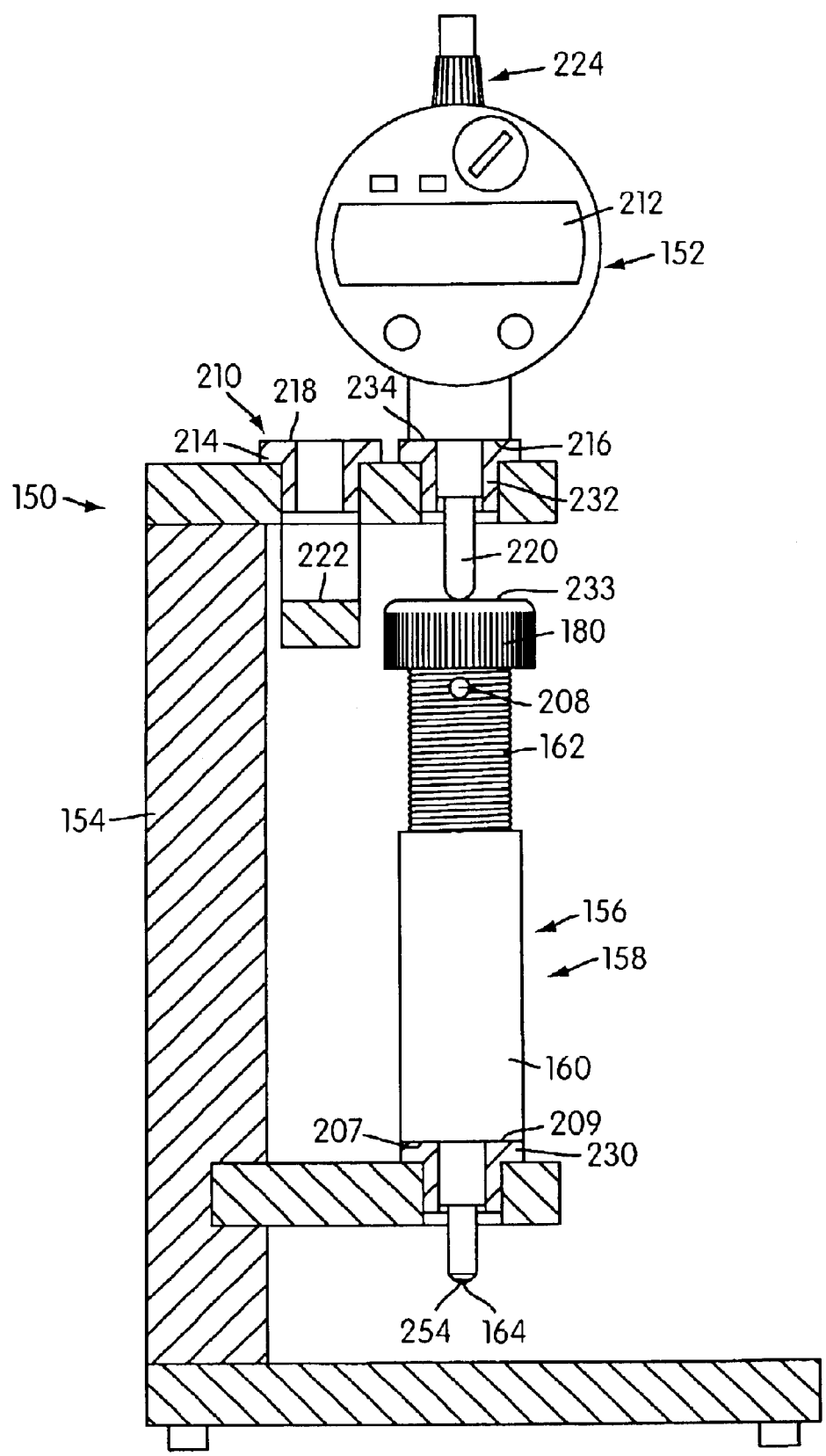
FIG. 6 shows another embodiment of a measuring device of the present invention, the figure showing the measuring device mounted in a verification stand and showing a plunge indicator mounted in the stand and engaged with the measuring device.
Figure 7:
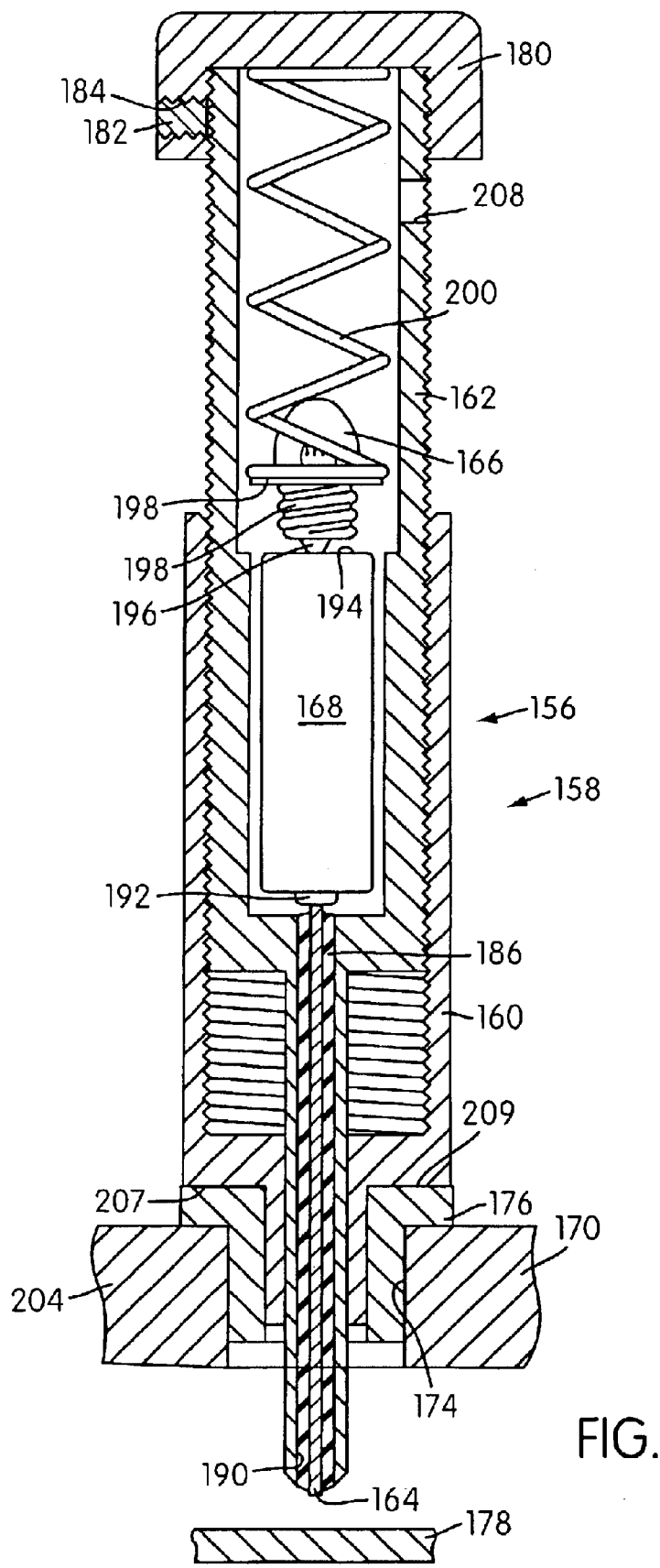
FIG. 7 is a cross sectional view of the measuring device illustrative in FIG. 6.

FIGS. 6–10 show another illustrative embodiment of a position sensing device, in the form of a measuring apparatus 150, as shown in FIG. 6. The measuring apparatus 150 includes a plunge indicator 152, a verification stand 154 and a measuring device 156. The construction of the measuring device 156 is shown in cross-sectional view in FIG. 7. The measuring device 156 includes a housing 158. The housing 158 includes an outer housing portion 160 and an inner housing portion 162. The inner housing portion 162 is movably coupled to the outer housing portion 160 and a probe 164 is affixed to the inner housing portion 162. An indicator in the form of a light source 166 and power source in the form of a battery 168 are disposed in the inner housing portion 162.

The measuring device 156 is shown mounted in a support member 170 in FIGS. 7–10. The support member 172 includes an opening 174. The measuring device 156 is constructed and arranged such that when the outer housing portion 160 is removably secured within the support member 170 (utilizing a bushing 176 that is constructed of an electrically conductive material), the probe 164 extends outwardly of the opening 174. Movement of the inner housing portion 162 with respect to the outer housing portion 160 when the outer housing portion is removably secured in the support member 170 moves the probe 164 with respect to the workpiece 178.

The inner portion 162 and the outer portion 160 of the housing are each constructed of an electrically conductive material and are electrically connected to one another. More specifically, the example inner housing portion 162 is an externally threaded tubular structure that is constructed of a metal material. The inner housing portion 162 has a hollow interior and open opposite ends. An internally threaded cap or knob 180 is threadedly engaged with the external threading on one end of the inner housing portion 162 and covers one open end of the inner housing 162. The example knob 180 is a metal structure (although any appropriate material can be used in its construction, including any appropriate electrically conductive material). A threaded member 182 is disposed in an internally threaded bore 184 in the knob 180. The threaded member 182 can be tightened against the inner housing portion 162 to secure the knob 180 on the inner housing portion 162.

The outer housing portion 160 is internally threaded and the inner housing portion 162 is threadedly engaged was the outer housing portion 160. The probe 164 is an electrically conductive member and is electrically insulated from the inner housing portion 162 by an insulating material 186. Insulating material 186 maybe, for example, a suitable plastic, a rubber or a composite material. The probe 164 extends outwardly of an opening 190 in the outer housing portion 160.

A first terminal 192 of the battery 168 this electrically connected to the probe 164 and a second terminal 194 of the battery 168 is electrically connected to a first terminal 196 of the light source 166. A second terminal 198 of the light source 166 is electrically connected through a metal coil spring 200 to the inner housing portion 162 (through the knob 180) of the housing 158. As will become apparent, the indicator 166 and the power source 168 are electrically connected between the probe 164 and the outer portion 160 of the housing 158 so that when the measuring device 156 is placed in the support member, the light source 166 is illuminated when the probe 164 is in contact with the workpiece.

Figure 8:
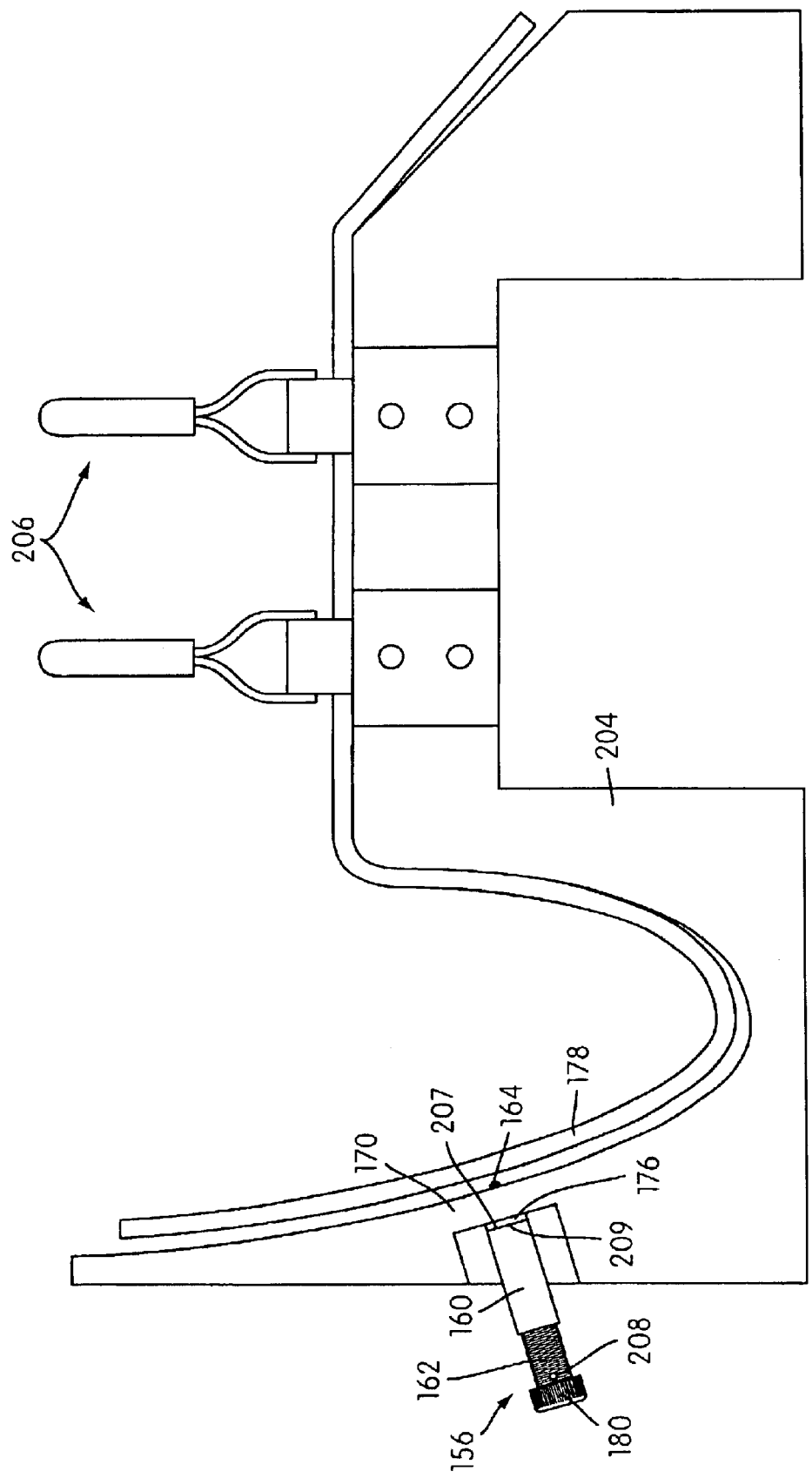
FIGS. 8–10 show a series of views of the measuring device of FIG. 6 being utilized in conjunction with a fixture to measure a workpiece with FIG. 10 illustrating the probe in contact with the workpiece.
Figure 10:
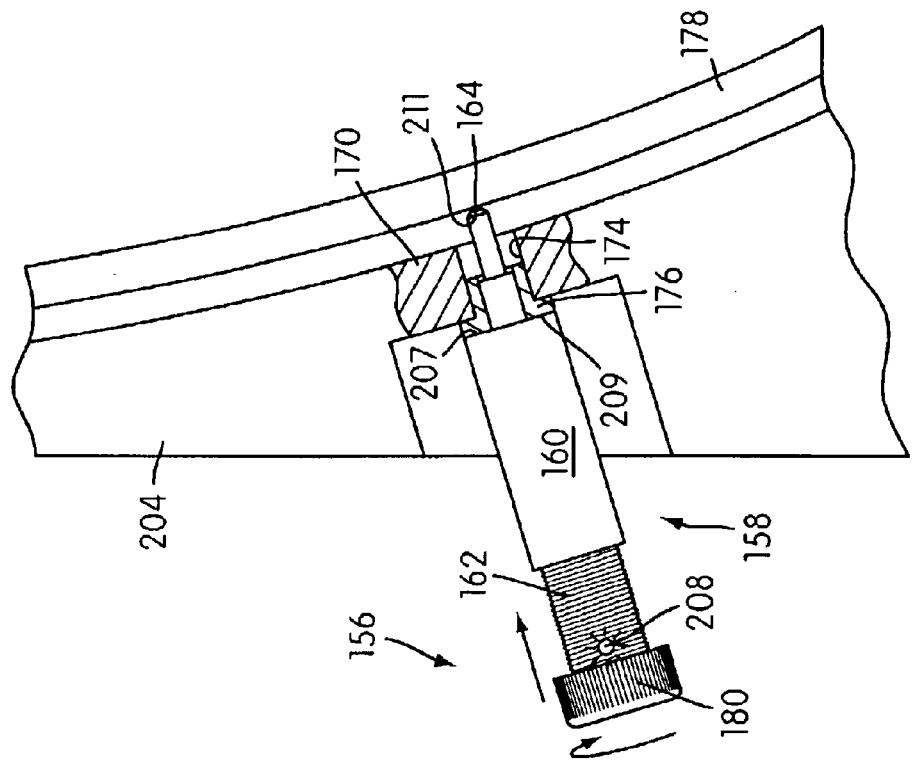
Figure 9:
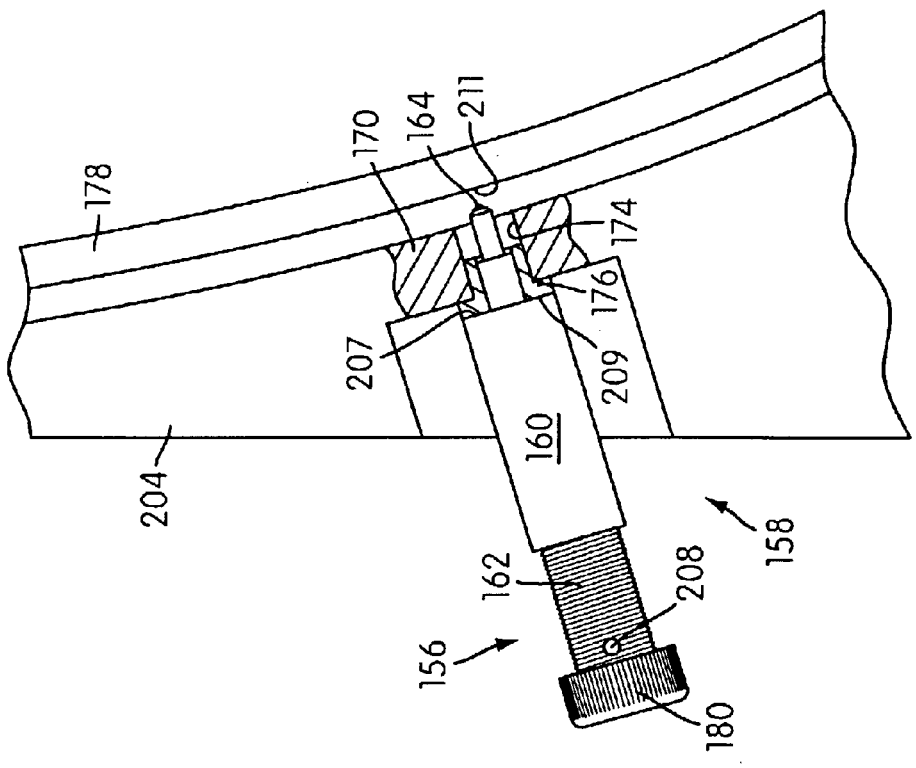

A workpiece 178 is shown mounted in a fixture 204 by clamps 206 in FIG. 8. The support member 170 is integrally formed on the fixture 204. When the measuring device 156 is inserted in the opening 174 of the support member 170, a support surface 207 of the housing 158 is in contact with an outer surface 209 of a bushing 176 mounted in the opening 174 of the support member 170. The fixture 204 is constructed so that when a dimensionally accurate workpiece 178 is mounted in the fixture 204, the distance between the outer surface 209 of the bushing 176 and the workpiece 178 is a predetermined distance. The measuring device 156 is inserted into the bushing 176 and the opening 174 of the support member 170 and the operator turns the knob 180 until the end of the probe 164 is just in contact with the surface of the workpiece 178. When the end of the probe 164 contacts the workpiece 178, the power source 168 supplies power to the light bulb 166, illuminating the same. The light from light bulb 166 is visible through a series of openings 208 (only one of which is shown in the figures) in the inner housing portion 162 of the housing 158. The light bulb 166 illuminates because the workpiece 178, the support member 170 and the fixture 204 are each constructed of a respective electrically conductive material so that the support member 170 (and bushing 176) is electrically connected to the workpiece 178 when the workpiece 178 is mounted in the fixture 204. Furthermore, the outer housing portion 160 is electrically connected to the workpiece 178 when the outer housing portion 160 is removably secured in the bushing 176 of the support member 170. Consequently, moving the probe 164 into contact with the workpiece 178 closes the circuit and supplies power to the light source 166.

The operator then places the measuring device 156 in the verification stand 154 (see FIG. 6) and uses the plunge indicator 152 to measure the dimensional accuracy of the workpiece 178. More specifically, the verification stand 154 includes a reference fixture or reference stand 210 that can be used to "zero" the plunge indicator 152 so that the display 212 on the plunge indicator 152 indicates a zero reading when the workpiece 178 is dimensionally accurate.

To "zero" the plunge indicator 152, the operator places plunge indicator 152 in bushing 214 of the reference stand 210 so that a support surface 216 on the plunge indicator 152 is in contact with a top surface 218 of the bushing 214 and a plunger 220 is biased against a reference surface 222 on the verification stand 154. The distance between surfaces 218 and 222 is a predetermined distance. The operator then "zeros" the plunge indicator 152 by manipulating control 224 so that the indicator 152 is set to a "zero" reading. The operator places the measuring device 156 in a lower bushing 230 on the verification stand 154 and places the plunge indicator 152 in a bushing 232 on the verification stand 154 so that the plunger 220 is on top of the measuring device 156. The display 212 of the plunge indicator 152 indicates the amount by which the distance between the outer surface 234 of the bushing 232 and the top surface 233 of the measuring device 156 varies from the predetermined distance. It can be understood that the distance from the support surface 207 of the housing 158 and the tip 242 of the probe 164 (see FIG. 6) is equal to the distance from the outer surface 209 of the bushing 176 on the fixture 204 and the adjacent surface 211 of the workpiece 178 (see FIGS. 9 and 10, for example). This distance is determined by determining the distance between surfaces 233 and 234 (see FIG. 6) with the plunge indicator 152.

Figure 11:
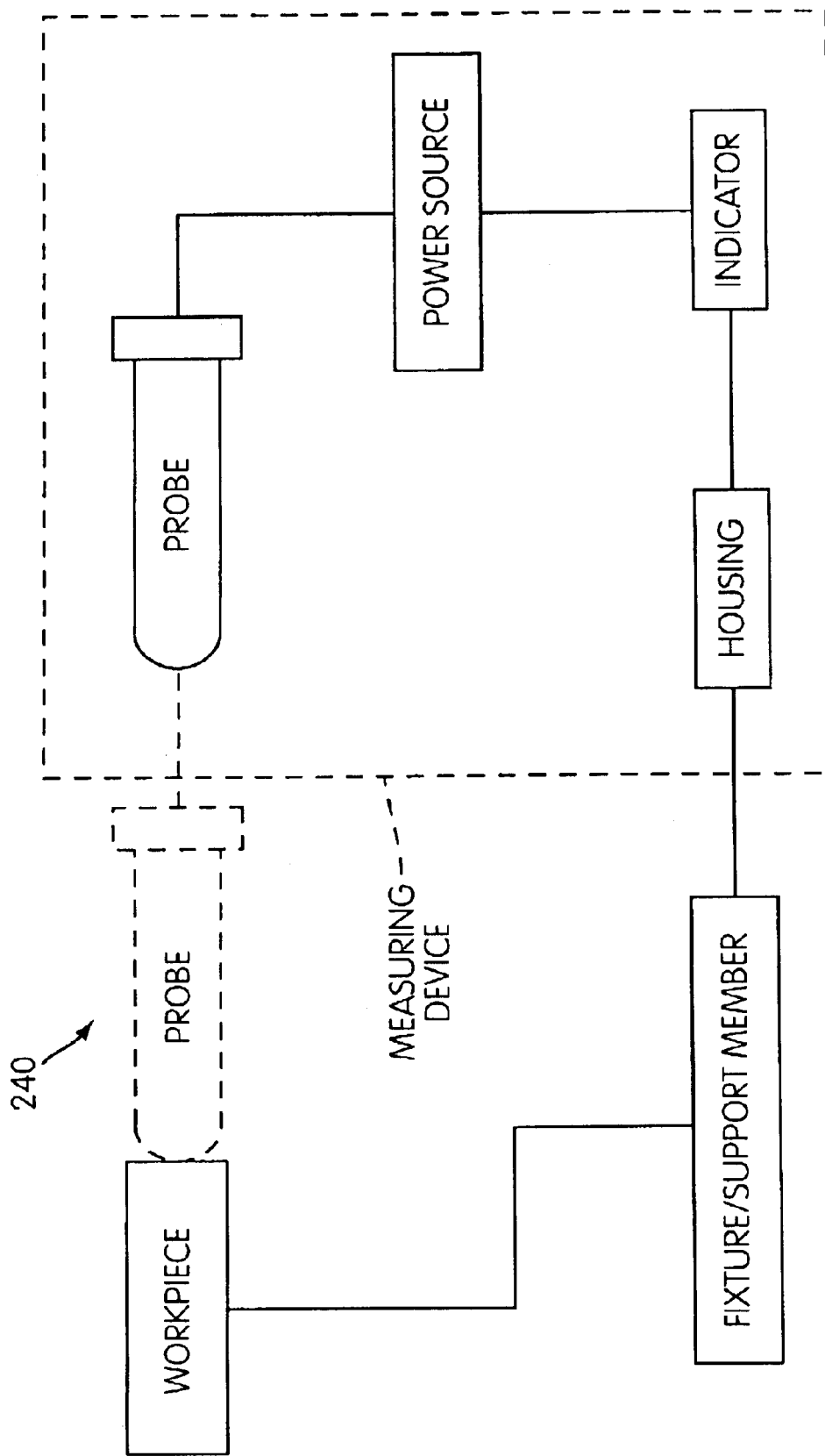
FIG. 11 is a block diagram of components that comprise an electrical circuit for selectively transmitting power form a power source to an indicator with the probe illustrative in dashed lines when in contact with the workpiece.

The operation of the measuring devices 10 and 156 are summarized in the block diagram 240 of FIG. 11. The diagram 240 illustrates the manner in which the various components of the system are electrically connected to one another. Generally, the indicator and power source are electrically connected between the probe and the housing. The housing is electrically connected to the workpiece through the support member and the fixture. Because the workpiece is made at least in part of an electrically conductive material, movement of the probe in contact with (shown in dashed lines in FIG. 11) and out of contact with (shown in solid lines in FIG. 11) the workpiece when the housing is mounted in the support member opens closes the circuit that powers the indicator.

Thus, the illustrative embodiments provide an inexpensive, compact and portable measuring device that is easy to operate, especially when taking a series of measurements on a series of parts. Additionally, since the illustrative embodiments provide an indication to the user when contact is first made, that is, when the circuit is closed and the indicator activated, the embodiments provides a measuring device that permits portions of a part to be checked for dimensional accuracy that are unsupported and that may move if placed under excessive force by a measuring probe. Therefore, the illustrative embodiments help to eliminate measuring inaccuracies.

It can be appreciated that the embodiments of the measuring device shown and described herein and the methods for using the same are examples only and are therefore intended only to illustrate the principles of the invention, but not limit the scope of these principles or the scope of the invention. Thus, many features and advantages of the present invention are apparent from the detailed description of the embodiments and the respective drawings. It is intended by the appended claims to cover the many features, aspects and advantages of the described invention which follow from the spirit and scope of the invention. Further, since numerous modifications and changes will readily occur to those of ordinary skill in the art, it is not desired or intended to limit the invention to the exact construction and operation of the illustrative embodiments described herein. Accordingly, all suitable modifications and equivalents of the electronic measuring devices and the methods of using the same fall within the spirit and scope of the invention.

What is claimed is:

1. An electronic measuring device, comprising:
a housing having an exterior surface configured and arranged to be removably secured within a support member such that said housing can be removably replaced in the support member;
an electrically conductive probe coupled to said housing configured and arranged to extend through the support member and move between a position in contact with a workpiece and a position out of contact with the workpiece;
an indicator and a power source, both disposed within said housing; and
a circuit electrically coupling said probe to said indicator and to said power source such that when said probe is out of contact with the workpiece, said circuit is open and no power is supplied from said power source to said indicator and such that when said probe contacts the workpiece, said circuit closes to supply power from said power source to said indicator to send a signal to the operator that said probe is in contact with the workpiece.

2. An electronic measuring device according to claim 1, wherein said housing includes an adapter mounted on a micrometer assembly, said micrometer assembly including a sleeve portion and a probe movably mounted in the sleeve.

3. An electronic measuring device according to claim 1, wherein said housing is constructed of an electrically conductive material.

4. An electronic measuring device according to claim 1, wherein said indicator is a light source.

5. An electronic measuring device according to claim 4, wherein said light source is a light bulb.

6. An electronic measuring device according to claim 1, wherein said power source is a battery.

7. An electronic measuring device according to claim 1, wherein said housing includes an outer portion and an inner portion, said inner portion being movably coupled to said outer portion, said probe being affixed to said inner portion and said indicator and power source being disposed in said inner portion.

8. An electronic measuring device according to claim 7, wherein said inner portion and said outer portion of the housing are each constructed of an electrically conductive material and are electrically connected to one another, and wherein said probe is electrically insulated from said inner portion of said housing.

9. An electronic measuring device according to claim 1, wherein said indicator and said power source are electrically connected between said probe and said exterior surface of said housing.

10. An electronic measuring device according to claim 1, wherein said housing forms part of a micrometer having a sleeve with measuring indicia and a thimble with measuring indicia and configured such that the thimble is rotatable about the sleeve.

11. A measuring assembly, comprising:
a fixture for removably holding a workpiece to be measured;
a support member positioned a predetermined distance from said fixture;
an electronic measuring device including
a housing having an exterior surface configured and arranged to be removably secured within said support member such that said measuring device can be removably replaced in said support member,
an electrically conductive probe coupled to said housing to move between a position in contact with said workpiece and a position out of contact with said workpiece, and
an indicator and a power source, both disposed in said housing; and a circuit electrically connecting said probe to said indicator and to said power source such that when said probe is out of contact with said workpiece, said circuit is open and said power source does not provide power to said indicator and when said probe contacts said workpiece, said circuit closes such that power is provided to said indicator to activate said indicator to send a signal to the operator of said measuring device that said probe is in contact with said workpiece.

12. A measuring assembly according to claim 11, wherein said housing includes an adapter mounted on a micrometer assembly, said micrometer assembly including a sleeve portion and a probe movably mounted in said sleeve.

13. A measuring assembly according to claim 12, wherein said housing and said workpiece are each constructed of an electrically conductive material, wherein said housing is electrically connected to said workpiece and is electrically insulated from said probe, said indicator and said power source being electrically connected between said housing and said probe so that said power source supplies power to said indicator when said probe contacts said workpiece and does not supply power to said indicator when said probe is out of contact with said workpiece.

14. A measuring assembly according to claim 13, wherein said support member and said fixture are each constructed of an electrically conductive material, wherein said support member is electrically connected to said workpiece when said workpiece is in said fixture and wherein said housing is electrically connected to said workpiece when secured in said support member.

15. A measuring assembly according to claim 11, wherein said indicator is a light source.

16. A measuring assembly according to claim 15, wherein said light source is a light bulb.

17. A measuring assembly according to claim 11, wherein said power source is a battery.

18. A measuring assembly according to claim 11, wherein said housing includes an outer portion and an inner portion, said inner portion being movably coupled to said outer portion, said probe being affixed to said inner portion and said indicator and power source being disposed in said inner portion.

19. A measuring assembly according to claim 11, wherein said support member includes an opening, said measuring device being constructed and arranged such that when said housing is removably secured within said support member, said probe extends outwardly of said opening and such that said probe is configured and arranged to move with respect to said workpiece.

20. A measuring assembly according to claim 18, wherein the inner portion and the outer portion of the housing are each constructed of an electrically conductive material and are electrically connected to one another, and wherein the probe is electrically insulated from the inner portion of the housing.

21. A measuring assembly according to claim 11, wherein said indicator and said power source are electrically connected between said probe and said exterior surface of said housing.

22. A measuring assembly according to claim 10, wherein said workpiece, said support member and said fixture are each constructed of an electrically conductive material such that said support member is electrically connected to said workpiece when said workpiece is mounted in said fixture, and wherein said exterior surface of said housing is electrically connected to said workpiece when said outer portion of said housing is secured in said support member.

23. A measuring assembly according to claim 11, wherein said housing forms part of a micrometer having a sleeve with measuring indicia and a thimble with measuring indicia and configured such that the thimble is rotatable about the sleeve.

24. A method of measuring, comprising:
 providing a fixture for removably holding a first workpiece to be measured;
 providing a support member positioned a predetermined distance from the fixture;
 providing an electronic measuring device including
  a housing having an exterior surface configured and arranged to be removably secured to the support member,
  an electrically conductive probe coupled to the housing for movement between a position in contact with the first workpiece and a position out of contact with the first workpiece, and
   an indicator and a power source, both disposed within said housing;
 providing a circuit electrically connecting the probe, the indicator and the power source such that when the probe is out of contact with the first workpiece, the circuit is open and no power is supplied from the power source to the indicator and such that when the probe contacts the first workpiece, the circuit closes and power is supplied from said power source to said indicator to signal the operator of the measuring device that the probe is in contact with the first workpiece;
 removably holding the first workpiece in the fixture;
 removably securing the measuring device into the support member;
 moving the probe into contact with the first workpiece until contact is made and the indicator sends a signal that contact with the first workpiece is achieved;
 removing the measuring device from the support member; and
 removing the first workpiece from the fixture.

25. A method according to claim 24, wherein the removably securing the measuring device occurs after the removably holding the first workpiece.

26. A method according to claim 24, wherein the removing the measuring device occurs after removing the first workpiece.

27. A method according to claim 24, further comprising:
 inserting a second workpiece into the fixture for measuring.

28. A method according to claim 27, wherein the inserting a second workpiece into the fixture occurs before the removing of the measuring device from the support member.

29. A method according to claim 27, further comprising:
 moving the probe into contact with the second workpiece until contact is made and the indicator sends a signal that contact with the second workpiece is achieved.

30. A method according to claim 24, wherein the providing the measuring device includes providing a micrometer having a sleeve with measuring indicia and a thimble with measuring indicia, and the method including rotating the thimble about the sleeve.

* * * * *